Dec. 2, 1958 M. A. ALEXANDER 2,863,072
PULSE GENERATOR
Filed Aug. 27, 1956

Inventor,
Matthew Arnold Alexander
BY Lyon & Lyon
ATTORNEYS 2,863,072

PULSE GENERATOR

Matthew Arnold Alexander, Los Angeles, Calif., assignor to Telemeter Magnetics, Inc., Los Angeles, Calif., a corporation of New York Application August 27, 1956, Serial No. 606,256

4 Claims. (Cl. 307—106)

This invention relates to waveform generators and, more particularly, to improvements therein.

There are many applications for standard pulse generators. These pulse generators usually generate pulses having waveforms of a desired type which may be employed for the purpose of determining response characteristics of networks. Although in many such applications it is desirable to have a pulse which is rectangular, it often happens that without the utilization of extremely complex and expensive pulse-shaping networks the wave shapes having the desired rectangularity cannot be simply generated.

An object of the present invention is the provision of apparatus for generating rectangular waveforms.

Another object of the present invention is the provision of simple and inexpensive apparatus for the generation of rectangular waveforms.

Still another object of the present invention is the provision of an improved rectangular pulse generator.

These and other objects of the present invention are achieved by apparatus which includes a first, or generating, delay line and a second, or matching, delay line. These two delay lines are substantially identical and may be made by taking a single delay line and cutting it in half. A switch is used to couple one end of the first delay line to one end of the second delay line. Output is derived from between the generating line and the matching line. The matching delay line has the characteristic impedance coupled to its other end. Voltage which is twice that of the desired output pulse is applied between the first delay line and the other end of the characteristic impedance. The switch is closed, at which time the output consists of a rectangular pulse having the amplitude of half the input voltage and a duration of twice the delay time of the delay line. The plateau of this output pulse is flat and does not drop off or rise.

Figure 1:
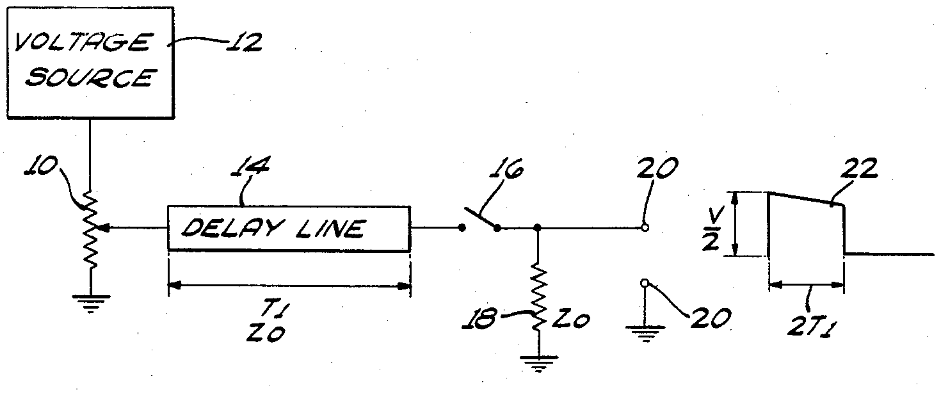
Figure 2:
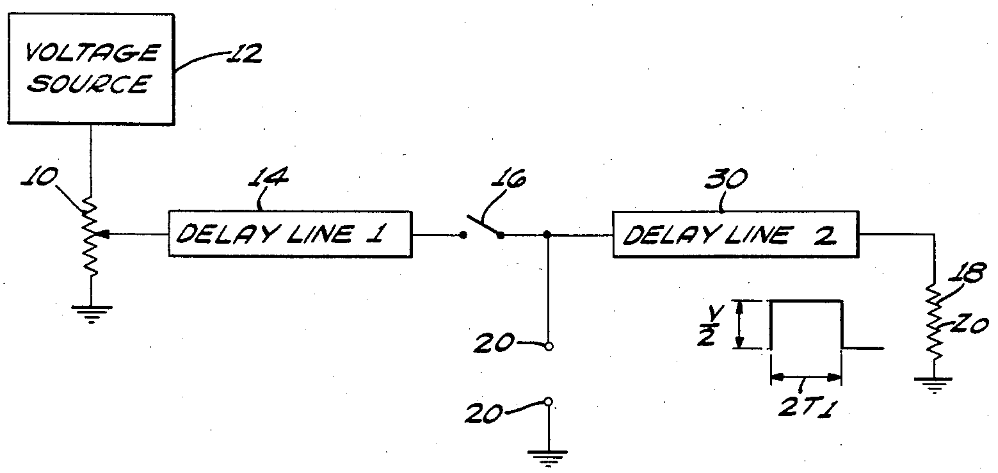

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 is a circuit diagram of the presently known arrangement for obtaining a desired pulse; and Figure 2 is a circuit diagram of the embodiment of the invention.

Reference is now made to Figure 1, which is shown by way of illustration, and to assist in the understanding of this invention. The presently known arrangement for using a delay line for obtaining a pulse with a rectangular wave shape is to provide a variable attenuator 10 across which a voltage is applied from a voltage source 12. The width desired for the voltage pulse, which may be here designated as $T_1$, determines the length of the delay line 14 which is selected. These delay lines are commercially purchasable and may either be a network having resistors and condensers or preferably the commercially purchasable delay line consisting of a coaxial arrangement wherein the center conductor is a helix and the capacitive elements of the delay line are determined by the characteristics and spacing of the material used to fill the space between the central conductor and the outer ground sheath. A switch 16 is employed which is selected to have as low a resistance when closed as possible. The preferred type of switch is therefore the mercury switch, in which the resistance when closed is on the order of a few micro-ohms. The delay line is connected to the attenuator 10 at its input end and its output end is connected to the switch 16. The swich is then connected to the impedance 18, which is selected to have the same characteristic impedance as the delay line 14. Output is derived from terminals 20.

When the switch 16 is open, the delay line charges up to the value of the voltage V, to which the delay line is connected on the voltage divider 10. When the switch is closed, the output across the terminals 20 consists of a pulse having an amplitude $$\frac{V}{2}$$

at the time $T=0$. The duration of this pulse is twice the delay line length, or $2T_1$. From the time $T=0$ to the time $T=2T_1$, the line introduces attenuation, and the output pulse, instead of having a flat top, drops off in the manner shown in the pulse waveform 22 in Figure 1. In those cases where it is desired to use the output pulse as a reference voltage pulse, this shape introduces difficulties.

Referring now to Figure 2, similar functioning apparatus has the same reference numerals. Thus, the delay line 14 is connected to the potentiometer 10, which has applied across it a voltage from the source 12. The switch 16 is used to couple a second delay line 30 to the first delay line 14. A characteristic impedance 18 is connected between the end of the second delay line and ground. This characteristic, or terminating, impedance has the same impedance value as the one shown in Figure 1. Output here is derived from the input to the second delay line 30. This time, upon closing the switch 16, the output voltage which is received is a pulse having rectangular wave shape with a flat top, a duration of twice the delay line length, and an amplitude of $$\frac{V}{2}$$

The simplest way to make the first and second delay line of the embodiment of the invention is to take a delay line having twice the desired length and to cut it in half. When the line 30 matches the delay line 14 properly, the attenuation of the voltage being derived as a function of time is the same.

If the second delay line is made to have a longer delay time than the first delay line, the output derived will include reflections as a result of the mismatch of the delay lines. These reflection pulses occur regularly and may be used as time-calibrating pulses. Furthermore, if desired, the impedance 18 may be replaced by a third delay line which is identical with the delay lines 1 and 2. However, when the arrangement is as shown in Figure 2, the output pulse which is derived is well defined and may be used as a standard throughout its duration.

Another useful function which this apparatus may serve is that for checking or testing whether or not delay lines are being made in accordance with the desired standards. The first delay line may be a desired standard delay line, and the second delay line may be the delay line under test. As long as the output pulse derived has the rectangular wave shape and does not have any of the effects of ringing, or reflections, the delay line under test is known to be properly made. A jig for the rapid insertion of delay lines under test, as well as for the insertion of standard delay lines against which the tested delay lines are to be matched, may be readily constructed.

Accordingly, there has been shown and described herein a novel, useful, and simple arrangement for obtaining rectangular pulse wave shapes.

I claim:

1. An improved pulse-generating network comprising a first delay network having input and output ends, a second delay network substantially identical to said first delay network, switch means coupling said first delay network output to said second delay network input, an impedance having one end connected to the output of said second delay network, said impedance having substantially the same value as said first and second delay networks, means to apply voltage to the input of said first delay network and the other end of said impedance, and means to derive an output pulse from the input to said second delay network.

2. An improved pulse-generating network as recited in claim 1 wherein said second delay network is made to provide a desired delay different than that of said first delay network to derive time-calibrating pulses from the input to said second delay network, the occurrence of said time-calibrating pulses being a function of said second delay network delay.

3. A pulse-generating network comprising a first and second delay line having input and output ends, switch means connected between said first delay line output end and said second delay line input end, an impedance having substantially the same value as that of said first and second delay lines, said impedance having one end connected to the output end of said second delay line, means to apply voltage to the input end of said first delay line, and means to derive an output pulse from the input end of said second delay line.

4. A pulse-generating network as recited in claim 3 wherein said impedance is a third delay line.

References Cited in the file of this patent

UNITED STATES PATENTS

| | | |
|---|---|---|
| 2,415,116 | Stiefel | Feb. 4, 1947 |
| 2,585,817 | Michaelis | Feb. 12, 1952 |